(12) United States Patent
Doray et al.

(10) Patent No.: US 9,268,413 B2
(45) Date of Patent: Feb. 23, 2016

(54) MULTI-TOUCH TOUCHSCREEN INCORPORATING PEN TRACKING

(75) Inventors: Bernard Doray, Nepean (CA); Paul To, Menlo Park, CA (US); Michael Haller, Linz (AT); James Robert Powell, Hamilton (NZ); Peter Brandl, Linz (AT); Jakob Leitner, Rainback (AT); Thomas Josef Seifried, Linz (AT); Moses Tao-Ling Ma, San Francisco, CA (US)

(73) Assignee: RPX CLEARINGHOUSE LLC, Dover, DE (US)

( * ) Notice: Subject to any disclaimer, the term of this patent is extended or adjusted under 35 U.S.C. 154(b) by 2360 days.

(21) Appl. No.: 12/168,678

(22) Filed: Jul. 7, 2008

(65) Prior Publication Data

US 2010/0001962 A1    Jan. 7, 2010

(51) Int. Cl.
*G06F 3/041* (2006.01)
*G06F 3/03* (2006.01)
*G06F 3/0354* (2013.01)
*G06F 3/042* (2006.01)
*G06F 3/0488* (2013.01)

(52) U.S. Cl.
CPC .......... *G06F 3/0317* (2013.01); *G06F 3/03545* (2013.01); *G06F 3/0421* (2013.01); *G06F 3/04883* (2013.01); *G06F 2203/04109* (2013.01); *G06F 2203/04808* (2013.01)

(58) Field of Classification Search
CPC ............ G06F 2203/04109; G06F 2203/04808; G06F 3/0317; G06F 3/03545; G06F 3/0421; G06F 3/04883
USPC ...................... 345/173–184; 178/18.01–18.09
See application file for complete search history.

(56) References Cited

U.S. PATENT DOCUMENTS

| 4,091,382 A | 5/1978 | Anderson et al. |
| 4,346,376 A | 8/1982 | Mallos |

(Continued)

FOREIGN PATENT DOCUMENTS

| CN | 1647100 A | 7/2005 |
| CN | 1925513 A | 3/2007 |

(Continued)

OTHER PUBLICATIONS

International Search Report for PCT/IB2009/005912, mailed Oct. 13, 2009.

(Continued)

*Primary Examiner* — Kumar Patel
*Assistant Examiner* — Insa Sadio
(74) *Attorney, Agent, or Firm* — Withrow & Terranova, P.L.L.C.

(57) ABSTRACT

The present invention relates to a multi-touch display system that supports both multi-touch human input as well as input from a digital pen. The display system has a display panel that is configured to allow human touches along a front surface to be detected and tracked. The display panel also includes a location pattern that preferably covers the viewable areas of the display panel. The location pattern is configured to allow any location within the location pattern to be detected by analyzing a portion of the display pattern that is associated with the particular location. The digital pen is used to "write" on the display panel, wherein such a writing function involves detecting the location where writing occurs and controlling display content that is displayed on the display panel to reflect what is being written.

28 Claims, 12 Drawing Sheets

(56) References Cited

U.S. PATENT DOCUMENTS

| | | | |
|---|---|---|---|
| 4,484,179 | A * | 11/1984 | Kasday .......................... 345/176 |
| 6,882,385 | B2 | 4/2005 | Kusumoto et al. |
| 2006/0227120 | A1 * | 10/2006 | Eikman .......................... 345/175 |
| 2007/0290047 | A1 * | 12/2007 | Tazaki et al. .................. 235/491 |
| 2008/0029691 | A1 | 2/2008 | Han |
| 2008/0179507 | A2 | 7/2008 | Han |
| 2008/0233360 | A1 * | 9/2008 | Sekine et al. .............. 428/195.1 |
| 2008/0284925 | A1 | 11/2008 | Han |
| 2009/0033637 | A1 | 2/2009 | Han |
| 2009/0219253 | A1 | 9/2009 | Izadi et al. |

FOREIGN PATENT DOCUMENTS

| | | |
|---|---|---|
| JP | 2003508831 A | 3/2003 |
| JP | 2005056357 A | 3/2005 |
| JP | 2005235174 A | 9/2005 |
| JP | 2008152640 A | 7/2008 |
| JP | 2009043228 A | 2/2009 |
| JP | 2009545828 A | 12/2009 |
| WO | 2007/127258 A2 | 11/2007 |
| WO | 2008/017077 A2 | 2/2008 |
| WO | 2008066004 A1 | 6/2008 |

OTHER PUBLICATIONS

Office Action mailed Mar. 30, 2011 in U.S. Appl. No. 12/168,688.

Brandl, Peter et al., "An Adaptive Rear Projection Screen Using Digital Pens and Hand Gestures," IEEE ICAT 2007, Nov. 2007, pp. 49-54, IEEE.

Brandl, Peter et al., "Combining and Measuring the Benefits of Bimanual Pen and Direct-Touch Interaction on Horizontal Interfaces," Proceedings of the working conference on Advanced visual interfaces, 2008, pp. 1-8.

Dietz, Paul et al., "DiamondTouch: A Multi-User Touch Technology," ACM Symposium on User Interface Software and Technology, Nov. 2001, pp. 219-226.

Elrod et al., "Liveboard: A Large Interactive Display Supporting Group Meetings, Presentations and Remote Collaboration," CHI '92, 1992, pp. 599-607, New York, NY, ACM Press.

Haller, Michael et al., "The Shared Design Space," ACM SIGGRAPH 2006 Emerging Technologies, 2006, p. 29, New York, NY, ACM Press.

Han, Jefferson Y., "Low-Cost Multi-Touch Sensing through Frustrated Total Internal Reflection," UIST '05, 2005, pp. 115-118, New York, NY, ACM.

Hodges, Steve et al., "ThinSight: Versatile Multi-touch Sensing for Thin Form-factor Displays," Proceedings of the 20th Annual ACM Symposium on User Interface Software and Technology, Oct. 7-10, 2007, pp. 259-268, New York, NY, ACM.

Izadi, Shahram et al., "ThinSight: Integrated Optical Multi-touch Sensing through Thin Form-factor Displays," Proceedings of the 2007 Workshop on Emerging Displays Technologies: Images and Beyond: the Future of Displays and Interaction, Aug. 4, 2007, vol. 252, New York, NY, ACM.

Matsushita, Nobuyuki et al., "HoloWall: Designing a Finger, Hand, Body and Object Sensitive Wall," Proceedings of the 10th Annual ACM Symposium on User Interface Software and Technology, Oct. 14-17, 1997, pp. 209-210, New York, NY, ACM.

Microsoft Surface, from http://www.surface.com, 2008, Microsoft Corporation.

Morrison, Gerald D., "A Camera-Based Touch Interface infrastructures, for Pervasive Displays," Workshop on pervasive display infrastructures, interfaces and applications, May 7, 2006.

Ryall, Kathy et al., "Experiences with and Observations of Direct-Touch Tabletops," Proceedings of the First IEEE Workshop on Horizontal Interactive Human-Computer Systems, 2006, pp. 89-96, Adelaide, South Australia, IEEE.

Wilson, Andrew D., "PlayAnywhere: A Compact Interactive Tabletop Projection-Vision System," Symposium on User Interface Software and Technology (UIST), 2005.

Wilson, Andrew D., "TouchLight: An Imaging Touch Screen and Display for Gesture-Based Interaction," Proceedings of the 6th International Conference on Multimodal Interfaces, Oct. 13-15, 2004, pp. 69-76, New York, NY, ACM.

Brandl, Peter et al., "An Adaptable Rear-Projection Screen Using Digital Pens and Hand Gestures," 17th International Conference on Artificial Reality and Telexistence 2007, 2007, pp. 49-54, IEEE Computer Society.

Haller, Michael, "Interactive Displays and Next-Generation Interfaces," Emerging Technologies for Learning, Mar. 2008, vol. 3, Becta.

Haller, Michael, "Natural User Interfaces," Apr. 2008, Media Interaction Lab, Upper Austria University of Applied Sciences, Hagenberg-Austria.

Haller, Michael et al., "Large Interactive Surfaces Based on Digital Pens," Nov. 20, 2007, Media Interaction Lab, Upper Austria University of Applied Sciences, Softwarepark 11, Austria.

International Search Report for PCT/IB2009/005741 mailed Sep. 29, 2009.

Final Rejection mailed Oct. 11, 2011, for U.S. Appl. No. 12/168,688, 13 pages.

Non-final Office Action for U.S. Appl. No. 12/168,688 mailed Jul. 23, 2012, 17 pages.

Final Office Action for U.S. Appl. No. 12/168,688, mailed Nov. 27, 2013, 15 pages.

Second Office Action for Chinese Patent Application No. 200980135801.6, mailed Nov. 29, 2013, 18 pages.

Decision on Rejection for Chinese Patent Application No. 200980135803.5, issued Apr. 30, 2014, 13 pages.

Third Office Action for Chinese Patent Application No. 200980135801.6, issued Jun. 4, 2014, 11 pages.

Non-final Office Action for U.S. Appl. No. 12/168,688 mailed Mar. 28, 2013, 13 pages.

Decision to Grant a Patent for Japanese Patent Application No. 2011-517256, mailed Jul. 23, 2013, 5 pages.

Decision to Grant a Patent for Japanese Patent Application No. 2011-517255, mailed Oct. 8, 2013, 5 pages.

Second Office Action for Chinese Patent Application No. 200980135803.5, mailed Oct. 14, 2013, 14 pages.

English translation of First Office Action for Chinese patent application 200980135801.6 issued Jan. 30, 2013, 21 pages.

English translation of First Office Action for Chinese patent application 200980135803.5 issued Feb. 5, 2013, 20 pages.

English translation of Non-final Office Action for Japanese patent application 2011-517255 mailed Mar. 5, 2013, 4 pages.

Notice of Allowance for U.S. Appl. No. 12/168,688, mailed Apr. 16, 2014, 8 pages.

European Search Report for European Patent Application No. 09794046.4 mailed Jan. 4, 2013, 8 pages.

European Search Report for European Patent Application No. 09794046.2 mailed Dec. 21, 2012, 9 pages.

* cited by examiner

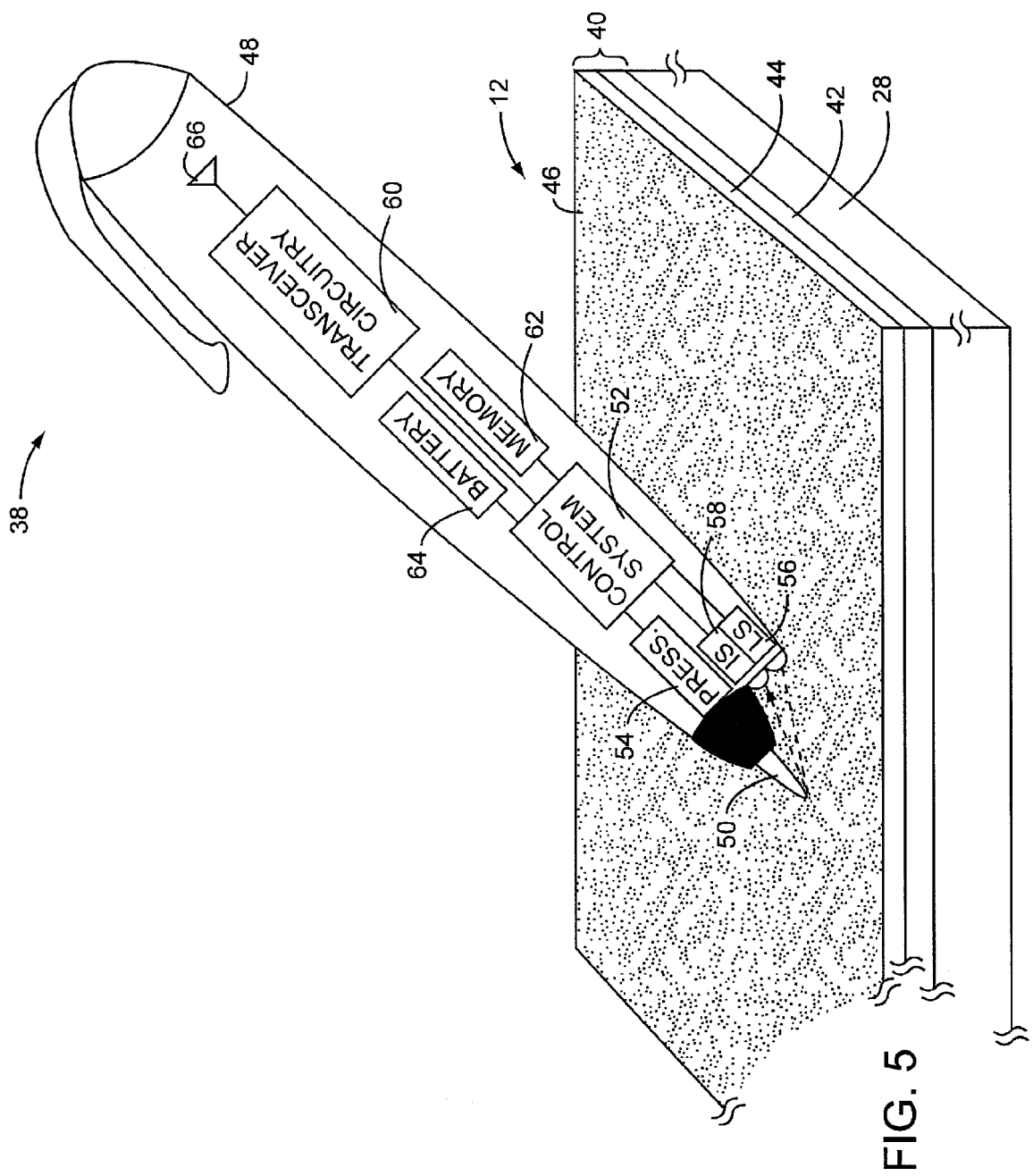

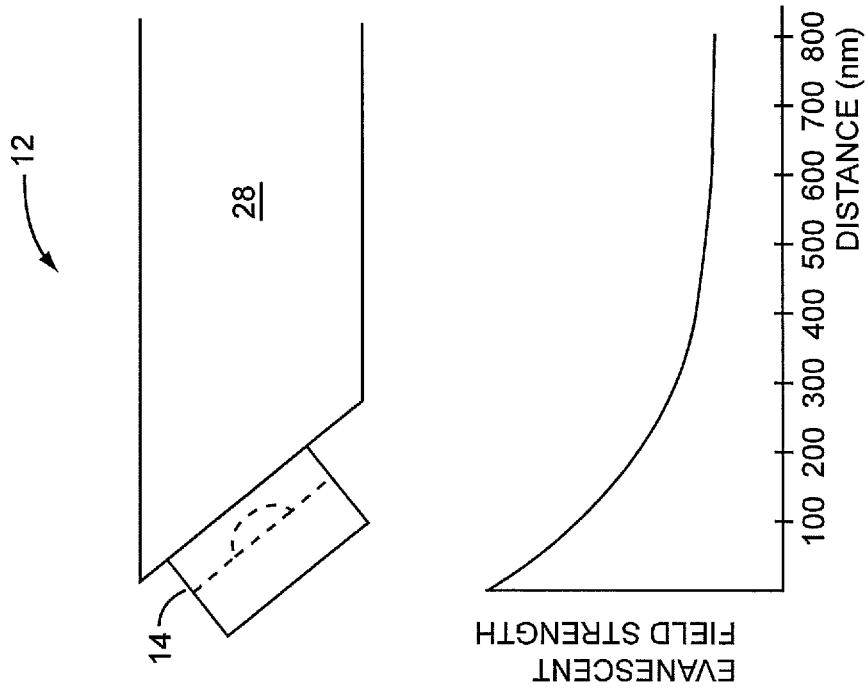
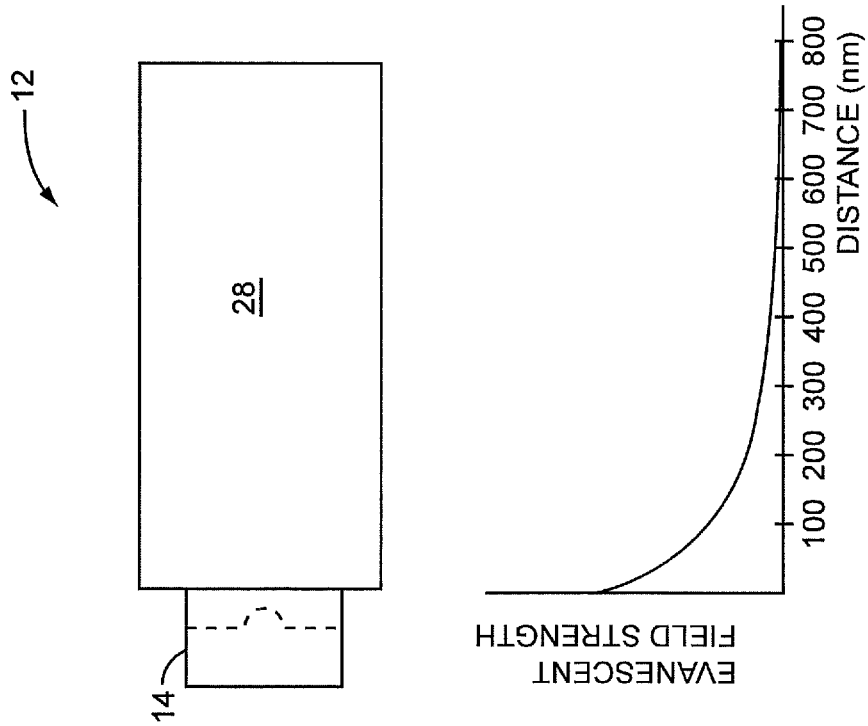

MULTI-TOUCH TOUCHSCREEN INCORPORATING PEN TRACKING

FIELD OF THE INVENTION

The present invention relates to multi-touch touchscreens, and in particular to incorporating pen tracking with a multi-touch touchscreen system.

BACKGROUND OF THE INVENTION

A touchscreen is a specially configured display device that is generally capable of detecting when a display panel is touched and the location of touches within the display panel. The touches may be provided by a stylus, human finger, or the like. A touchscreen provides an additional or alternative input device to a keypad, keyboard, or mouse for a wide range of electronic devices, such as point of sale devices, hand-held electronics, interactive displays, work stations, personal computers, automated teller machines, and the like. Historically, these touchscreen systems have employed different types of technologies to sense the location of touches, but have been limited to being able to detect the location of only a single touch at any given time.

In recent years, multi-touch touchscreens have been developed that are capable of sensing multiple touches at the same time. The ability for a touchscreen to detect and track multiple touches represents a revolutionary step forward in interface technology. One can readily imagine the freedom such technology can impart to specialty users, such graphics designers, presenters, photographers, and architects, as well as general computer users. With multi-touch touchscreens, one or more users can use multiple fingers to select, manipulate, and drag displayed objects at the same time. The potential for such applications is vast, especially as the size of the multi-touch touchscreens increases.

The most commercially notable multi-touch touchscreen to date is the primary interface and display on the Apple® iPhone. The iPhone allows a user to use two fingers at the same time to perform various functions through the touchscreen, including enlarging or shrinking an object being displayed by respectively sliding the fingers apart or sliding the fingers toward each other along the surface of the touchscreen. The iPhone touchscreen relies on a capacitive grid to detect the coordinates and movement of the different touches; however, the use of the capacitive grid means that the touchscreen cannot detect the touch of a stylus or human touches through non-conductive gloves. Further, the use of the capacitive grid substantially limits the scalability of the touchscreen and the number touches that can be tracked at any given time. For the iPhone, only two touches are generally used at any given time. As such, only relatively small displays are able to incorporate the iPhone's touchscreen technology. Many other current touchscreen technologies suffer from the same operational and size limitations.

Promising new multi-touch technologies are being developed for large display panels by corporations such as Perceptive Pixel, Inc. (www.perceptivepixel.com) and Microsoft Corporation (www.microsoft.com/surface). These technologies employ rear projection technology to project display content on the back of a large display panel such that the display content is viewable from the front of the display panel. The touch detection relies on sensing infrared (IR) light being emanated or reflected from the back of the display panel in response to the front of the display panel being touched. The IR light is generally only emanated from the spots being touched, and IR sensors are capable of detecting the intensity, location, and any movement associated with the touches. An associated processor receives the corresponding touch information from the IR sensors and processes the touch information as user input. The processor is configured to control the display content based on the user input derived from the display panel being touched.

Although these technologies provide remarkable multi-touch interactivity, the technology is essentially limited to human touch and is generally not capable of tracking contact and movement of smaller, non-human objects, such as a stylus from a pen-type instrument or the like. The effective touch sensitivity of the display panel and the IR sensors is relatively low, thereby limiting the resolution at which a user may operate to the size of their fingers. Accordingly, multi-touch applications are limited to relatively high level selection, movement, and outlining functions. Small scale handwriting, drawing, selection, and the like that would require operating at higher resolutions is not currently feasible. Further, when multiple users are interacting with the display panel, these technologies are not capable of differentiating between different users who are touching the display panel.

Yet a further drawback for these technologies is the impact of ambient light on detecting IR light that is emanated or reflected from the rear of the display panel. Ambient light is often incandescent or natural light, which has a relatively high IR light content. The ambient IR light interferes with the IR light that is emanated or reflected from the rear of the display panel in response to a touch, and effectively reduces the ability of the IR sensors to detect when and how the display panel is being touched. For example, the ability to determine the relative intensity or force associated with the touch is generally inversely proportional to the amount of ambient IR light, and is difficult when ambient light is changing.

Accordingly, there is a need for a large-scale multi-touch touchscreen system that is capable of detecting touches and movement associated therewith from styluses and other non-human objects. There is a further need for a multi-touch screen system that is capable of differentiating touches from different users. There is still a further need for a multi-touch screen system that is capable of operating in a more efficient manner in incandescent and natural light environments.

SUMMARY OF THE INVENTION

The present invention relates to a multi-touch display system that supports both multi-touch human input as well as input from a digital pen. The display system has a display panel that is configured to allow human touches along a front surface to be detected and tracked. These human touches are used as input to the overall display system. The display panel also includes a location pattern that preferably covers the viewable areas of the display panel. The location pattern is configured to allow any location within the location pattern to be detected by analyzing a portion of the display pattern that is associated with the particular location. The digital pen is used to "write" on the display panel, wherein such a writing function involves detecting the location where writing occurs and controlling display content that is displayed on the display panel to reflect what is being written. To facilitate such writing, portions of the location pattern where the digital pen is writing at any given time are analyzed to determine where the writing is occurring on the display panel. The display content may be manipulated to include the writing as it was written and at the location where it was written. As such, the display content reflects what is being written on the display panel by the digital pen.

In one embodiment, the location pattern is an Anoto pattern, which was developed by Anoto, Inc. Location patterns like the Anoto pattern use dots, marking, or other graphics to create a continuously variable pattern, wherein each unique portion of the location pattern provides information sufficient to identify the location of that portion of the location pattern. The location pattern may also be encoded to identify the particular display panel on which the location pattern is provided. As such, different display panels may be identified from the location pattern.

The digital pen represents any type of digital writing device and can take various forms. In general, the digital pen is capable of detecting the location pattern and providing corresponding information to a central processing system for the display system through wired, or preferably wireless, communications. The display panel may be an integrated display panel wherein the display technology is integrated into the panel, such as that used for LCD or plasma-based displays. In a preferred embodiment, the display system employs rear projection technology, wherein a projector is used to project an image of the display content on the rear of the display panel and the image is viewable from the front of the display panel. The multi-touch technology for sensing human touches may include any known technology that is compatible with the display technology being used. However, the preferred embodiment of the present invention employs rear projection display technology and multi-touch technology, which relies on the sensing of infrared reflections that correspond to human touches.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 5 illustrates a digital pen according to one embodiment of the present invention.

FIGS. 9A and 9B illustrate the difference in evanescent field strength between the prior art and one embodiment of the present invention.

DETAILED DESCRIPTION OF THE PREFERRED EMBODIMENTS

Figure 1:
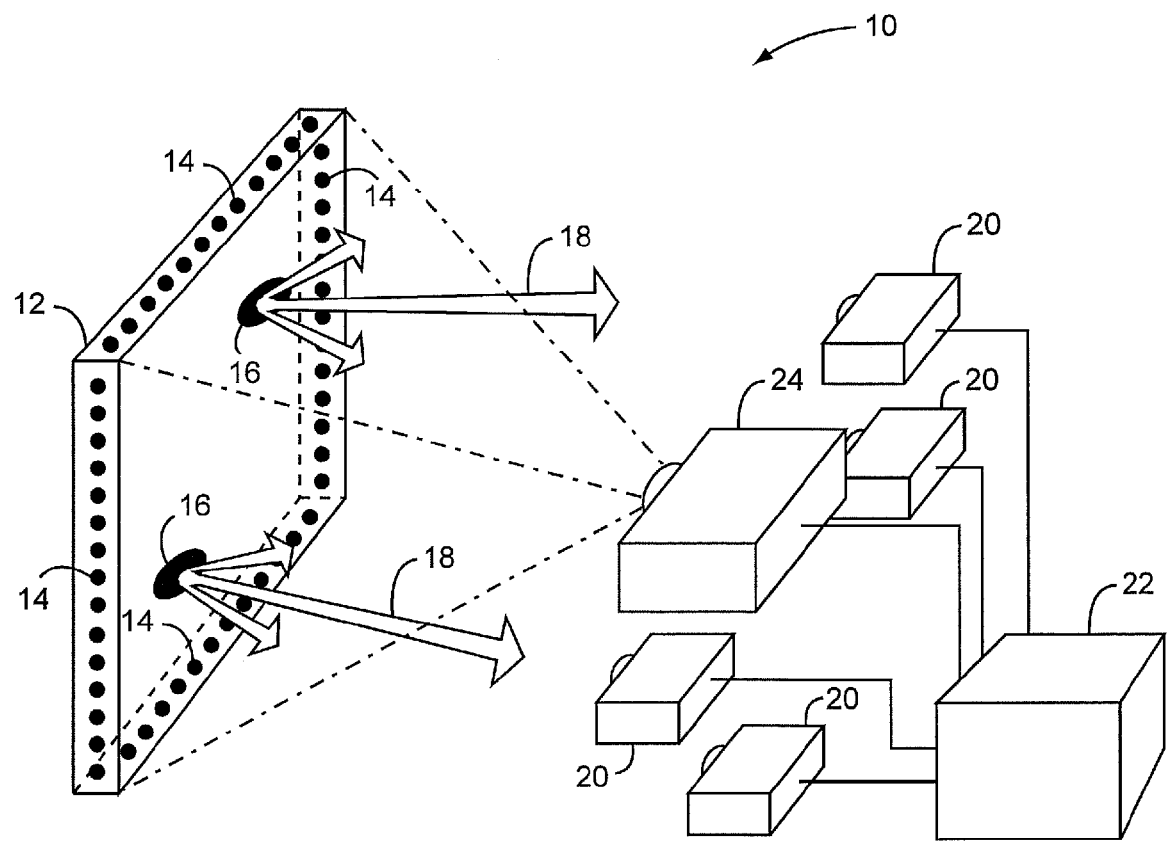
FIG. 1 is a block representation of a multi-touch display system according to the prior art.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a multi-touch display system that supports both multi-touch human input as well as input from a digital pen. The display system has a display panel that is configured to allow human touches along a front surface to be detected and tracked. These human touches are used as input to the overall display system. The display panel also includes a location pattern that preferably covers the viewable areas of the display panel. The location pattern is configured to allow any location within the location pattern to be detected by analyzing a portion of the display pattern that is associated with the particular location. The digital pen is used to "write" on the display panel, wherein such a writing function involves detecting the location where writing occurs and controlling display content that is displayed on the display panel to reflect what is being written. To facilitate such writing, portions of the location pattern where the digital pen is writing at any given time are analyzed to determine where the writing is occurring on the display panel. The display content may be manipulated to include the writing as it was written and at the location where it was written. As such, the display content reflects what is being written on the display panel by the digital pen.

In one embodiment, the location pattern is an Anoto pattern, which was developed by Anoto, Inc. Location patterns like the Anoto pattern use dots, marking, or other graphics to create a continuously variable pattern, wherein each unique portion of the location pattern provides information sufficient to identify the location of that portion of the location pattern. The location pattern may also be encoded to identify the particular display panel on which the location pattern is provided. As such, different display panels may be identified from the location pattern.

The digital pen represents any type of digital writing device and can take various forms. In general, the digital pen is capable of detecting the location pattern and providing corresponding information to a central processing system for the display system through wired, or preferably wireless, communications. The display panel may be an integrated display panel wherein the display technology is integrated into the panel, such as that used for LCD or plasma-based displays. In a preferred embodiment, the display system employs rear projection technology, wherein a projector is used to project an image of the display content on the rear of the display panel and the image is viewable from the front of the display panel. The multi-touch technology for sensing human touches may include any known technology that is compatible with the display technology being used. However, the preferred embodiment of the present invention employs rear projection display technology and multi-touch technology, which relies on the sensing of infrared reflections that correspond to human touches.

Prior to delving into the details of the present invention, an overview of promising multi-touch touchscreen technology for larger display panels that was developed by Jeff Han of Perceptive Pixel, Inc. is provided. Additional information can be obtained at perceptivepixel.com. Embodiments of the present invention may be employed in association with the Perceptive Pixel technology; however, the present invention is not limited to being implemented in association with the Perceptive Pixel technology. With particular reference to FIG. 1, a multi-touch display system 10, such as that developed by Jeff Han, is centered about a specially configured display panel 12, which acts as both a rear projection screen and a multi-touch touchscreen panel. An image projected from the rear of the display panel 12 is viewable from the front of the display panel 12, and the front of the display panel 12 provides the tactile, or touching, surface for a user to touch when providing an input to the multi-touch display system 10.

The multi-touch display system 10 relies on the optical phenomena of total internal reflection (TIR) and frustrated total internal reflection (FTIR) to detect when, where, and how the display panel 12 is being touched. These phenomena are described in greater detail after the overview of the various components of the multi-touch display system 10. In general, a state of TIR occurs when light rays traveling inside the display panel 12 are maintained within the display panel 12 and effectively no portion of the light rays escape and travel outside of the display panel 12. For the multi-touch display system 10, at least a portion of the display panel 12 acts as waveguide for infrared (IR) light that is injected into the display panel 12 by an array of IR light-emitting diodes (LEDs) 14. The IR LEDs 14 are spaced along the perimeter edges of the display panel 12 and positioned to radiate IR light into the display panel 12 such that the IR light is normally maintained in the display panel 12 to facilitate a state of TIR when the display panel 12 is not being touched.

A state of FTIR occurs, when the state of TIR is disturbed, or frustrated. Such disturbance may be caused by the display panel 12 being touched. The points where the display panel 12 is touched are referred to as touch points 16. When the front surface of the display panel 12 is touched at the touch points 16, the state of TIR is disturbed. As a result, certain IR light that would otherwise be maintained within the display panel 12 is scattered and exits the rear of the display panel 12 as FTIRs 18.

Multiple FTIR sensors 20 are positioned behind the display panel 12 and are configured to detect and monitor the relative location and intensity of the FTIRs 18 coming from the rear of the display panel 12. Since the light escaping the display panel 12 is IR light, the FTIR sensors 20 are IR light detectors. Although IR light is discussed herein, other types of visible or non-visible light may be employed. The FTIR sensors 20 determine metrics associated with the FTIRs 18 and provide corresponding FTIR information to a processor 22, which may take the form of a personal computer, server, control system, or the like. The processor is able to process the FTIR information and determine how the display panel 12 is being touched. With this system, multiple touches can be detected and tracked at any given time. The touches may range from simple taps to complex touch and drag motions where a precise path of touch is monitored. The intensity of the touches may also be monitored because the intensity of the FTIRs 18 is generally proportional to the pressure associated with each touch. Accordingly, various aspects of multiple touches of the display panel 12 can be tracked by the processor 22 at any given time. The touches and nature of the touches are processed as touch inputs to the multi-touch display system 10. The touch inputs are used to control operation of the multi-touch display system 10.

The multi-touch display system 10 also includes a projector 24 that is capable of projecting still or video content on the rear of the display panel 12. As noted, the display panel 12 is configured such that images projected on the rear of the display panel are viewable from the front of the display panel 12 in traditional rear-projection fashion. The projected content is the display content for the multi-touch display system 10. The display content may be generated in whole or in part by the processor 22 and provided to the projector 24, which will project the display content on the rear of the display panel 12. The processor 22 may include or be associated with any number of media devices or players from which all or a portion of the display content may be accessed or derived. At least in part, the processor 22 will control the display content presented to, and thus projected by, the projector 24 in response to the touch inputs to provide an interactive system. Notably, the entire multi-touch display system 10 may be provided in a single enclosure, wherein at least the display panel 12 is coupled to an articulating member that allows the display panel 12 to be rotated between horizontal and vertical orientations.

Figure 2:
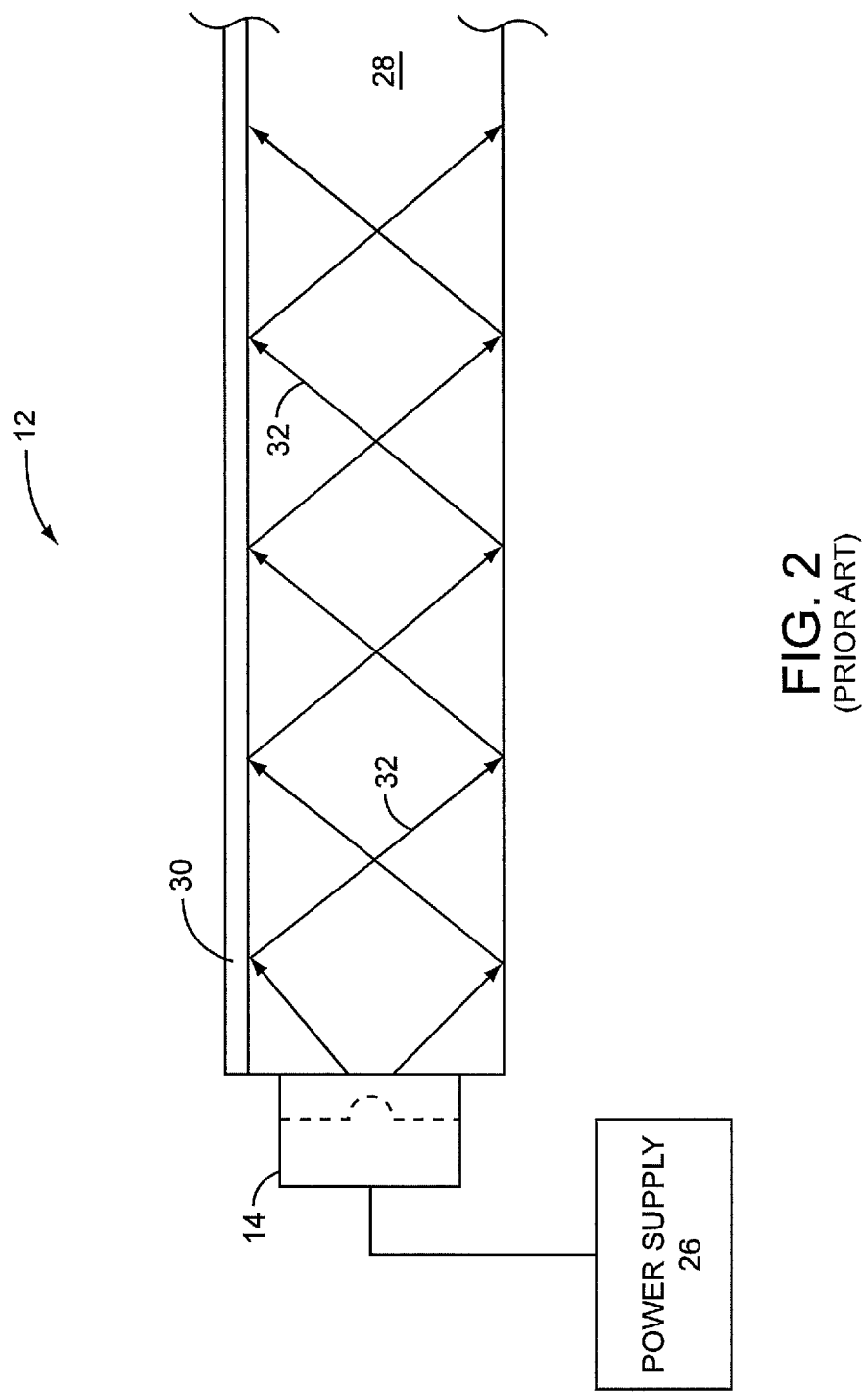
FIG. 2 illustrates total internal reflections in a display panel of the prior art.

The following provides an overview of the concepts of TIR and FTIR in association with the previously described display panel 12. With reference to FIG. 2, a display panel 12 is illustrated wherein a power supply 26 drives the IR LEDS 14 that reside around the perimeter edge of the display panel 12. For clarity, only one of the numerous IR LEDs 14 is illustrated. The display panel 12 is shown to include a waveguide panel 28 and a surface layer structure 30, which resides on the top surface of the waveguide panel 28 and may include one more layers. The waveguide panel 28 is generally a clear acrylic or like polymer. The surface layer structure 30 represents the front of the display panel 12 and provides the surface to be touched. The surface layer structure 30 is preferably compliant and provides a translucent surface on which the display content is projected, since the waveguide 28 is formed from a clear material. The bottom surface of the waveguide panel 28 represents the rear of the display panel 12 that faces the projector 24.

A boundary is formed between the top surface of the waveguide panel 28 and the bottom surface the surface layer structure 30. Assume the acrylic of the waveguide panel 28 has a different index of refraction than the bottom layer of the surface layer structure 30. In general, when IR light rays traveling in the waveguide panel 28 cross the boundary and enter the surface layer structure 30, the IR light rays are partially refracted and partially reflected. The refracted IR light rays change direction at the boundary and travel into and through the surface layer structure 30. The reflected IR light rays are reflected back into the first material and continue traveling through the waveguide panel 28. The scenario is the same for the boundary formed between the bottom surface of the waveguide panel 28 and air.

A state of TIR is achieved when essentially all of the IR light rays traveling in the waveguide panel 28 are totally reflected back into the waveguide panel 28 after reaching a boundary, and thus, effectively none of the IR light rays are refracted into the surface layer structure 30 or air on either side of the waveguide panel 28. As such, the IR light rays stay within the waveguide panel 28. Those IR light rays that stay within the waveguide panel 28 are referred to as internal reflections 32. Certain conditions are generally required for TIR. First, the refractive index of the waveguide panel 28 must be greater than that of the bottom layer of the surface layer structure 30 as well as the air on the other side of the waveguide panel 28. Second, the angle of incidence for the IR light rays must be greater than the critical angle associated of the waveguide panel 28. The angle of incidence is a measure of the angle at which the light ray is traveling with respect to a line normal, or perpendicular, to the top or bottom surface of the waveguide panel 28. The critical angle is generally dependent on the composition of the waveguide panel 28 and corresponds to the angle of incidence above which TIR occurs in the waveguide panel 28.

Figure 3:
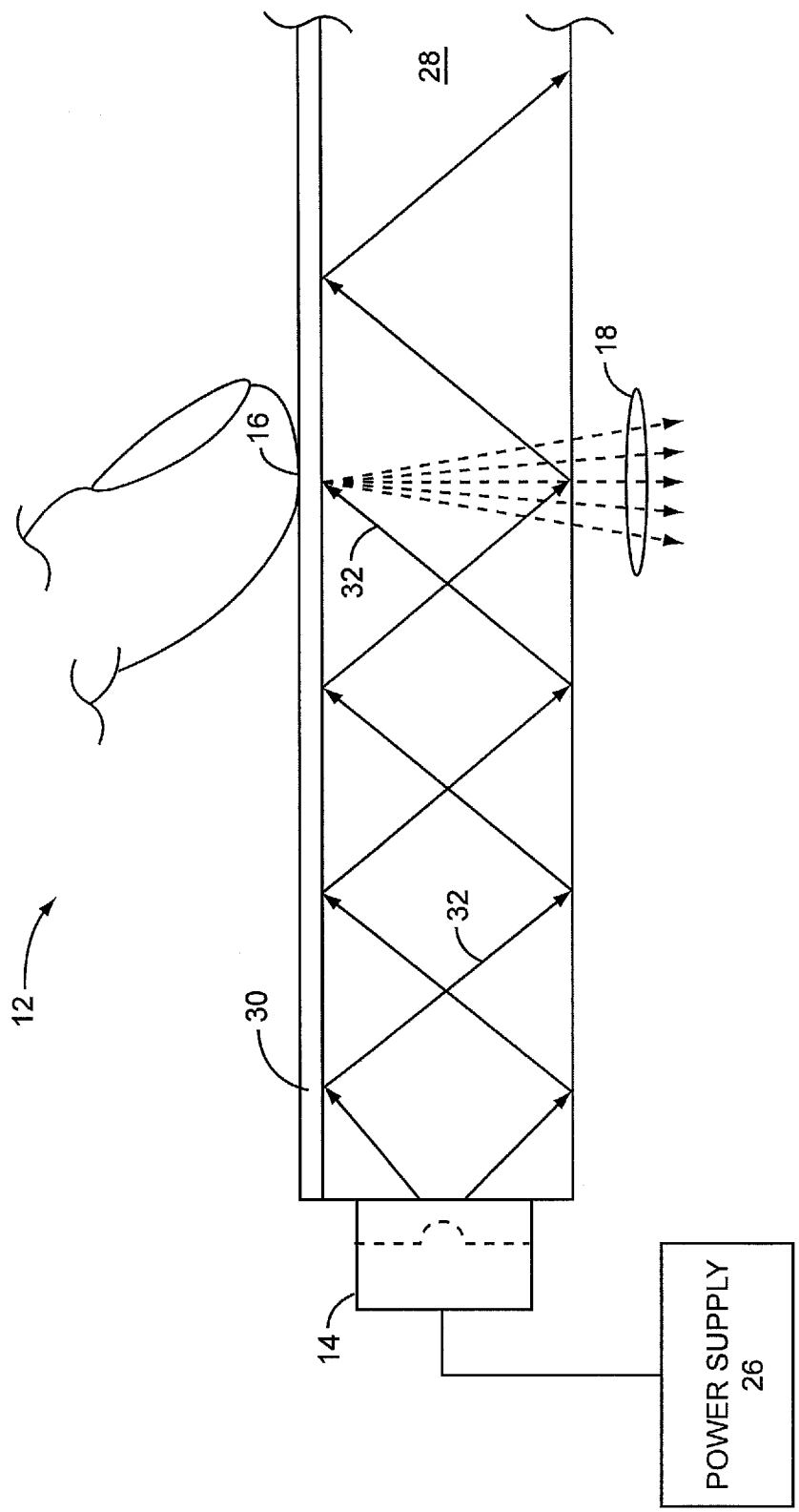
FIG. 3 illustrates frustrated total internal reflections in a display panel according to the prior art.

With reference to FIG. 3, an exemplary FTIR state occurs when the state of TIR is disturbed, and IR light rays that are normally reflected back into the first material are scattered and travel outside of the waveguide panel 28 as FTIRs 18. As illustrated, FTIRs 18 may be caused by a person touching the surface layer structure 30 at a touch point 16. Such touching causes the compliant surface layer structure 30 to compress, which results in a disturbance along the boundary, wherein IR light rays are reflected back into the waveguide panel 28 in such a manner as to have angles of incidence that are less than the critical angle associated with a state of TIR. As such, these IR light rays exit the bottom surface of the waveguide panel 28 as FTIRs 18 and become detectable by the FTIR sensors 20. The FTIRs 18 exit the bottom surface of waveguide panel 28 at a point substantially opposite of the touch point 16. Further, the force of the touch at the touch point 16 generally controls the intensity of the FTIRs 18. Depending on the amount of ambient light, the FTIR sensors 20 may be able to determine the duration, location, and relative intensity of the touch as well as track any subsequent movement of the touch point 16. Any number of touches can be tracked and used as inputs to the processor 22. In certain embodiments, ten or more touches may be tracked at any given time.

As noted above, these multi-touch touchscreen technologies provide remarkable multi-touch interactivity. However, the technology is essentially limited to human touch and is generally not capable of tracking contact and movement of smaller, non-human objects, such as a stylus from a pen-type instrument or the like. The effective touch sensitivity of the prior art display panels 12 and the IR sensors 20 is relatively low, thereby limiting the resolution at which a user may operate to the size of their fingers. Accordingly, multi-touch applications are limited to relatively high level selection, movement, and outlining functions. Small scale handwriting, drawing, selection and the like that would require operating at higher resolutions are not feasible. Further, these technologies are not capable of differentiating between different users who are touching the display panel 12.

The present invention provides the ability for these multi-touch touchscreen technologies to detect stylus touches and their associated intensities as well as track subsequent movements of the stylus across the display panel 12. For the purposes of description, a stylus defines the part of a non-human instrument, such as a pen device, that is used to interact with the display panel 12.

Figure 4:
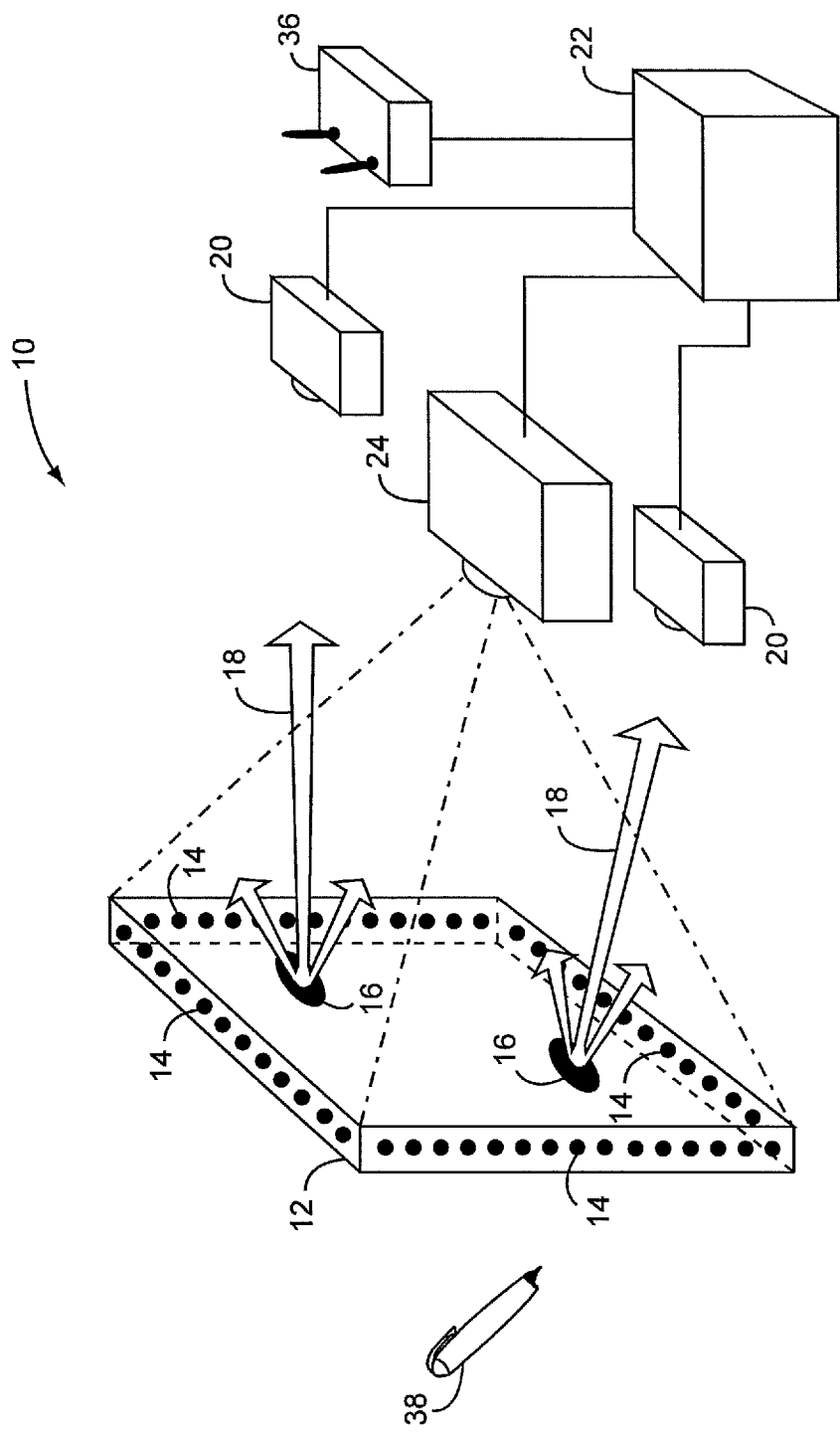
FIG. 4 is a block representation of a multi-touch display system according to one embodiment of the present invention.

According to one embodiment of the present invention, the multi-touch display system 10 described above is modified as illustrated in FIG. 4. In particular, a wireless access point 36 is provided in association with the processor 22 and is configured to support wireless communication with a digital pen 38. As will be described in detail further below, the digital pen 38 is capable of gathering writing information sufficient to determine when the digital pen 38 is being used to "write" on the display panel 12, what is being written on the display panel 12, and where it is being written on the display panel 12. Further, the writing information identifies the location of the digital pen 38 during each pen stroke against the display panel 12. The terms "write," "writing," and "written" are defined to relate to text (including numbers, letters, and symbols), drawing objects, symbols, doodling, and the like. Accordingly, these terms are not limited solely to text. The digital pen 38 may process the writing information to generate pen data, and transmit the pen data wirelessly to the wireless access point 36. Alternatively, the writing information may be sent from the digital pen 38 with little or no processing as pen data to the wireless access point 36. Notably, the digital pen 38 may or may not have an ink cartridge. Regardless of the presence of an ink cartridge, the digital pen 38 is configured to allow writing on the display panel 12 without applying ink to the display panel 12. Any writing appearing on the display panel 12 is rendered as display content by the processor 22.

The pen data is passed to the processor 22 and processed as user input, which may be used along with other touch information provided from the FTIR sensors 20 to control the display content projected on the display panel 12. Preferably, the actual or processed writing information is provided in real time to the processor 22 via the wireless access point 36. The processor 22 will immediately processes the pen data to determine what content is written and where the content is written on the display panel 12. The processor 22 may also process the display content to include the written content, as it was written, in the display content. Preferably, the display content is continuously updated in real time with a substantial replica of the written content as the content is being written on the display panel 12. As such, handwriting appears as the actual handwriting and sketches appear as the actual sketches in real time. In addition to capturing and displaying the written content in real time, the pen strokes or the like interactions can be used as any other touch input to select, drag, and the like. These control interactions may also be transferred in a processed or unprocessed form as pen data to the processor 22.

Each digital pen 38 will preferably have a unique identity, which is transmitted with the pen data. The processor 22 can identify the particular digital pen 38 from which any given written content was created and process it accordingly. Multiple digital pens 38 may be used to write on the display panel 12 at the same time. The processor 22 may process the writing information from different ones of the digital pens 38 at the same time and in the same or different manners, depending on the supporting application. Accordingly, a large scale multi-touch display system 10 is provided that is capable of processing multiple human touches as well as multiple digital pen interactions at the same time. Further, the interactions from the different digital pens 38 may be distinguished from each other, such that inputs from different users can be differentiated.

With reference to FIG. 5, an exemplary digital pen 38 is illustrated as being engaged with a surface of the display panel 12. In this embodiment, the display panel 12 includes the waveguide panel 28 and surface layers 40 that reside on the waveguide panel 28. In particular, the surface layers 40 include a compliant layer 42 that has a refractive index that is lower than that of the waveguide panel 28. Preferably, the compliant layer 42 is relatively clear and will allow a projected image that is passed through the waveguide panel 28 to be presented on a projection layer 44, which resides over the compliant layer 42. Preferably, the projection layer 44 effectively provides a screen on which the projected display content is displayed. Again, the projected display content is viewable from the front or top of the display panel 12.

As illustrated, a location pattern 46 is printed on or in the surface layers 40, and preferably on the projection layer 44. The location pattern 46 preferably provides a unique pattern across the entire viewable area of the display panel 12. The digital pen 38 is able to gather writing information based on the location pattern 46, and either process the location pattern 46 to determine the precise location of the digital pen 38, or deliver the location information as pen data to the processor 22, which may process the location pattern 46 to determine the location of the digital pen 38. In general, the location information is continuously updated and used to track the movement, and thus pen strokes, associated with using the digital pen 38 to write information on the display panel 12.

Figure 6A:
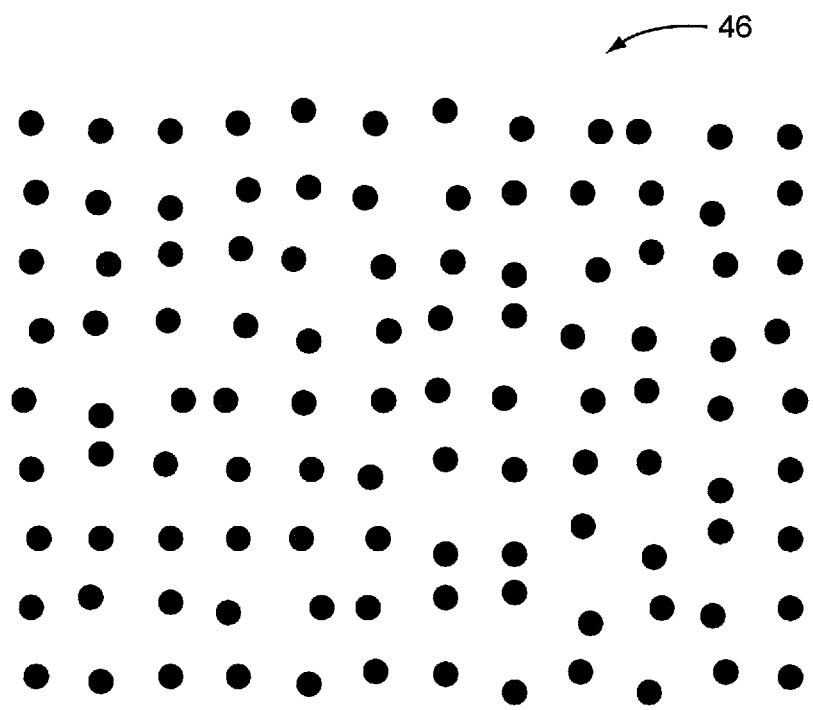
FIGS. 6A and 6B illustrate an Anoto pattern that is used in certain embodiments of the present invention.
Figure 6B:
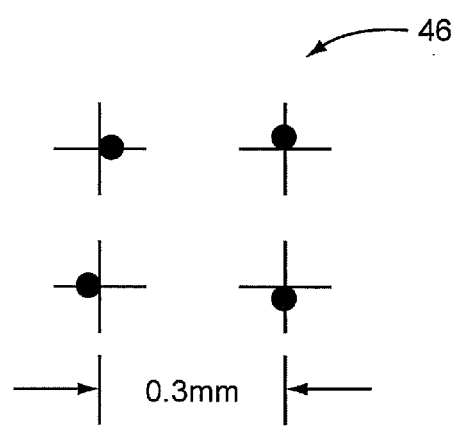

Preferably, the location pattern 46 is configured such that the patterns at any location throughout the entire surface area of the display panel 12 are unique and enable a precise location to be detected by analyzing a small portion of the location patterns 46. As such, the locations at which writing occurs for any number of digital pens 38 may be tracked and processed at any given time. In a preferred embodiment, the location pattern 46 is the same or analogous to an Anoto pattern. The Anoto pattern was developed in association with a digital pen that is capable of reading an Anoto pattern on paper that has the Anoto pattern printed on it by Anoto, Inc. Further information on Anoto patterns may be obtained at Anoto.com. The Anoto pattern comprises a large number of very small dots that have a nominal spacing of 0.3 mm. Although the dots have a nominal spacing of 0.3 mm, the dots create a pattern that uniquely identifies any location on the surface of the display panel 12. An exemplary section of an enlarged Anoto pattern is provided in FIG. 6A, wherein the continuously variable offsets of the dots from the 0.3 mm grid is illustrated in FIG. 6B. In addition to being able to uniquely identify any location on the display panel 12, the Anoto pattern may also be configured to uniquely identify the display panel 12, such that different display panels 12 will have a unique signature. A digital pen 38 may be able to interact with any number of multi-touch display systems 10 that are within wireless communication range of each other, wherein the digital pen 38 or processor 22 will be able to identify the particular display panel 12 that is being written upon.

Returning to FIG. 5, the digital pen 38 will generally include a body 48 to which a stylus 50 is attached. The stylus 50 represents the writing tip, and thus the point of contact, for the digital pen 38 to the display panel 12. At the heart of the digital pen 38 is a control system 52, which is associated with a pressure sensor 54, an IR light source (LS) 56, such as an IR light-emitting diode (LED), an image sensor (IS) 58, transceiver circuitry 60, and memory 62. These components are preferably powered by a battery 64 through appropriate power supply circuitry, which is not illustrated. Notably, the transceiver circuitry 60 is associated with the control system 52 as well as one or more antennas 66 to facilitate bi-directional wireless communications with the wireless access point 36. These communications may be based on any wireless communication standard, such as the IEEE's 802.11 wireless local area network standards, as well as personal area network standards, such as Bluetooth or wireless universal serial bus (USB). Although a wireless configuration is depicted and described herein, the digital pen 38 may communicate with the processor 22 through a wired interface, which is not illustrated.

The pressure sensor 54 is coupled to the stylus 50, and is configured to detect when the stylus 50 is pressed against the display panel 12, and preferably to monitor the relative force associated with the contact. As such, the pressure sensor 54 can pass associated force information to the control system 52 for storage, processing, or a combination thereof. This force information is considered writing information, and may be used to determine when the digital pen 38 is being used to write on the digital panel 12, and perhaps the intensity associated with such writing. As such, the written content may ultimately be displayed in the display content in a manner indicative of the effective weight associated with writing the content on the display panel 12. At a minimum, the pressure sensor 54 allows the control system 52 to determine when writing is taking place.

Detecting the writing itself involves the IR light source 56 and the image sensor 58. Preferably, the location pattern 46 and the projection layer 44 are configured such that the dots or other pattern indicia of the location pattern 46 absorb IR light emitted from the IR light source 56, and reflect light that is not absorbed by the location pattern 46 back to the image sensor 58. The image sensor 58 and the control system 52 cooperate with one another to effectively provide an IR camera. The IR camera may take many pictures per second of the location pattern 46 when the stylus 50 is in contact with the display panel 12. Each picture captures the reflected IR light that is not absorbed by the location pattern 46 and is proximate to or about the point on the display panel 12 that is in contact with the stylus 50. This picture information may be considered writing information, and is processed either by the control system 52 or passed to the processor 22 for processing. Regardless of the location of processing, each image is processed to identify the time that it was captured and the location of the stylus 50 when the image was captured. The location may be identified as coordinates or the like. As the sequence of images is processed, the location, direction, and distance of any movement associated with a given stroke of the digital pen 38 can be calculated. As the strokes are detected, the written content can be determined. Accordingly, the digital pen 38 may facilitate detection of the exact location and nature of every stroke of the digital pen 38 against the display panel 12.

Figure 7:
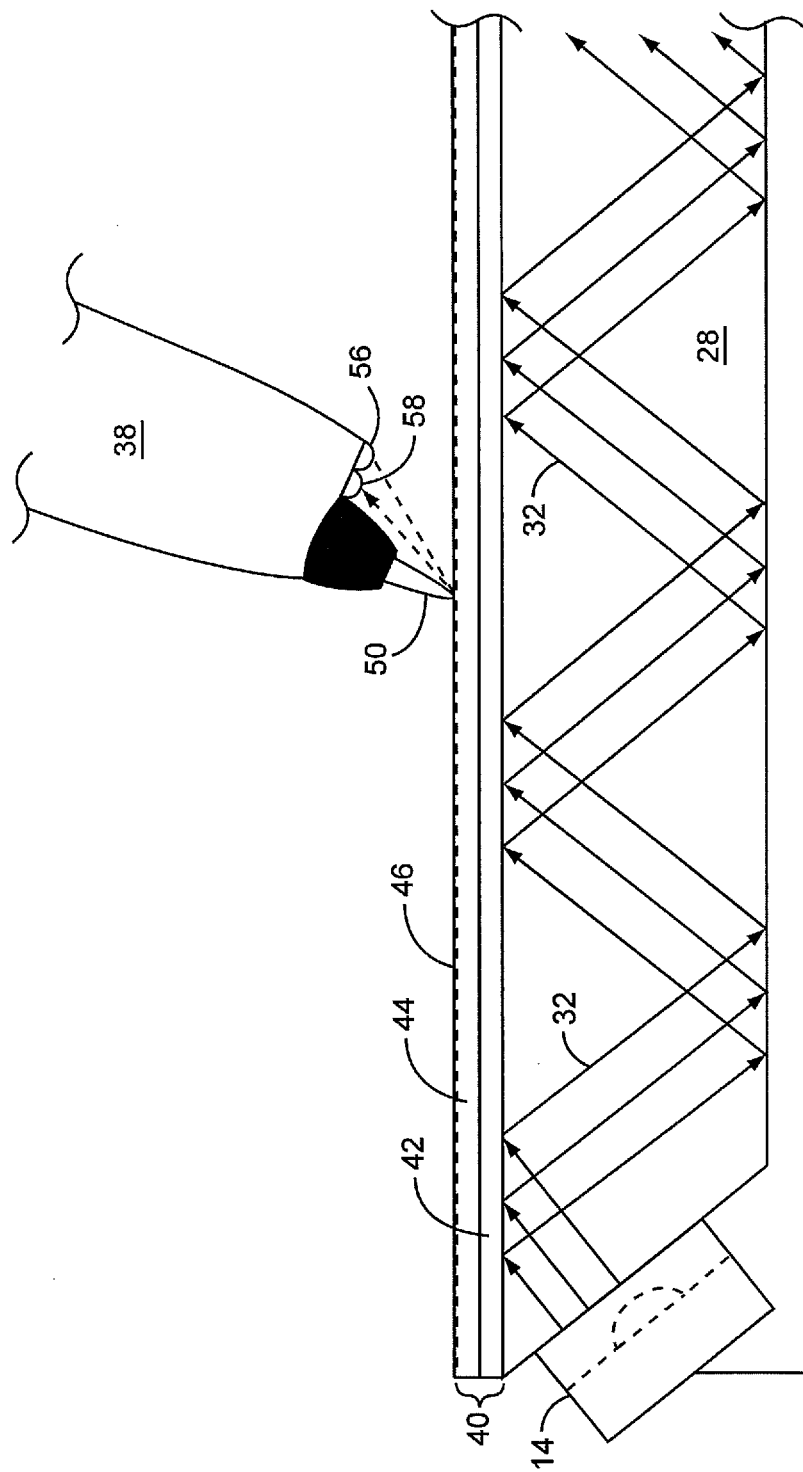
FIG. 7 illustrates total internal reflections in a display panel according to one embodiment of the present invention.

Turning now to FIG. 7, a cross-section of a display panel 12 is illustrated, wherein a digital pen 38 is in contact with the projection layer 44. Notably, the TIR effect is preferably not affected by the stylus 50 of the digital pen 38 being in contact with the surface layers 40. Typically, the relatively small size of the point of the stylus 50 when compared to a human finger is such that any surface disturbances by the stylus 50 are not sufficient to trigger an FTIR effect. Alternatively, the processor 22 may subtract out the input of any FTIRs 18 that are caused by the digital pen 38, since the location of the digital pen 38 is known.

Figure 8:
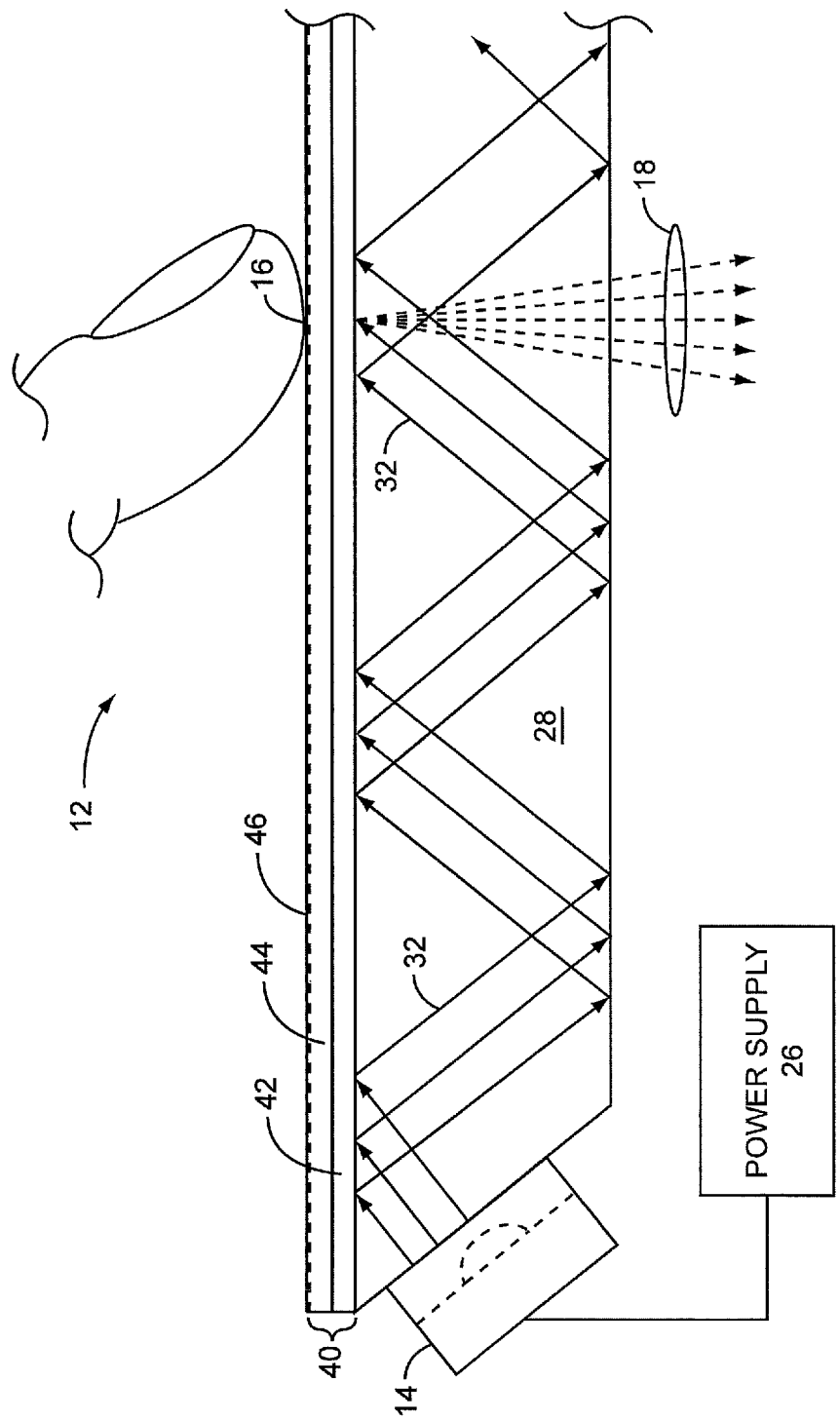
FIG. 8 illustrates frustrated total internal reflections in a display panel according to one embodiment of the present invention.

As illustrated in FIG. 7, the perimeter edge (left side) of the waveguide panel 28 is beveled, instead of being perpendicular to the face of the display panel 12, as was illustrated in the prior art embodiments of FIGS. 2 and 3. Applicants have discovered that forming a perimeter edge with a bevel and coupling the IR LEDs 14 such that they are perpendicular to the beveled surface of the perimeter edge greatly enhances multi-touch performance. If the bevel is between about 30 and 60 degrees, and preferably about 45 degrees from the top or bottom surfaces of the waveguide panel 28, the TIR and FTIR effects are enhanced and provide greater sensitivity to human touches. The TIR effect is still maintained when the digital pen 38 is in contact with the display panel 12, yet significantly stronger FTIRs 18 are provided in response to human touches, and in comparison with the prior art embodiments illustrated in FIGS. 2 and 3, as shown in FIG. 8. Further, the use of beveled perimeter edges significantly increases the sensitivity to human touch as well as the ability to differentiate between different intensities of human touch.

Figure 10:
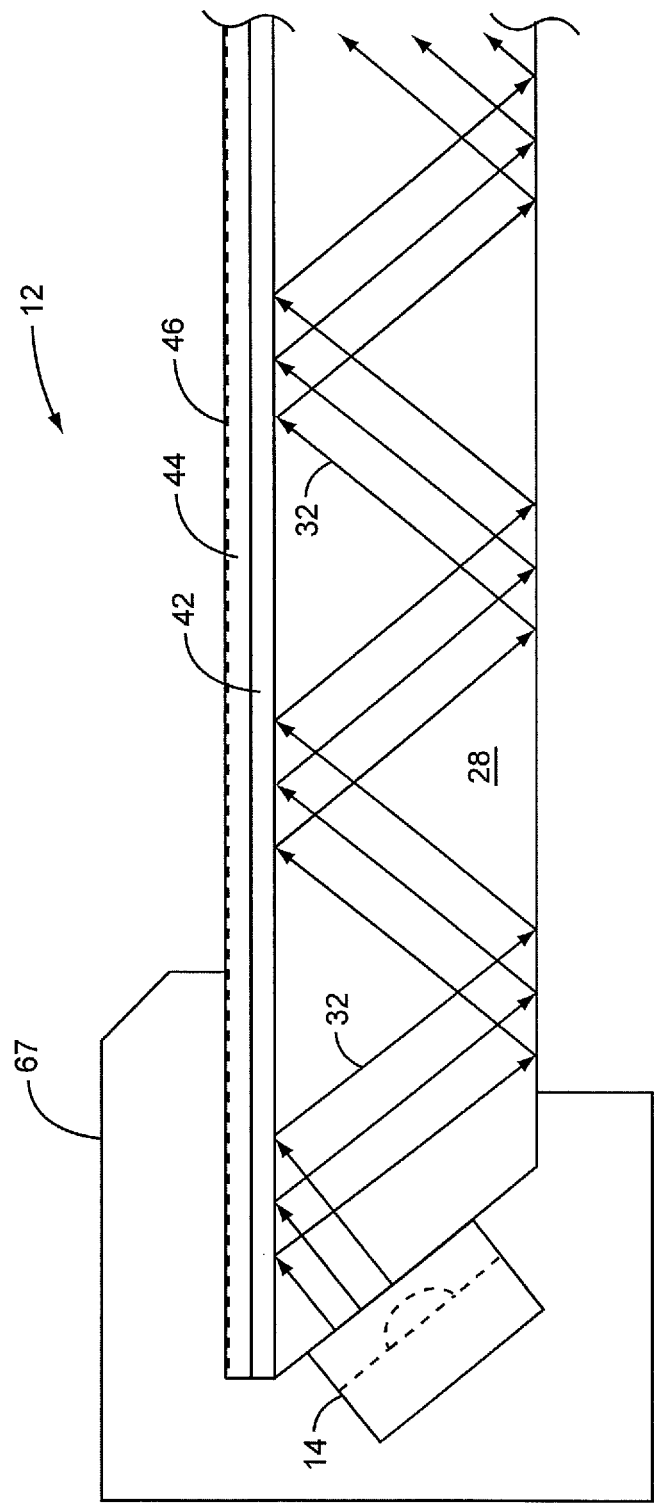
FIG. 10 illustrates the use of a frame for baffling according to one embodiment of the present invention.

The increased performance is primarily due to a significant increase of the evanescent field formed outside the surfaces of the waveguide panel 28. The evanescent field is the light field that extends past the surfaces of the waveguide panel 28 during a state of TIR. When the evanescent field is disturbed, an FTIR effect may be triggered. The greater the evanescent field, the greater the sensitivity to evanescent field disturbances, and the greater intensity of resulting FTIRs 18. A comparison of the relative evanescent field strengths associated with a perpendicular perimeter edge and a beveled perimeter edge is illustrated in FIGS. 9A and 9B. As is clearly demonstrated, the evanescent field strength is significantly higher at the surface of the waveguide panel 28, and remains significantly higher at all distances outside of the waveguide panel 28. As illustrated in FIG. 10, the use of baffling 67 that may be a part of a frame for the display panel 12 may be used to retain IR light that is trapped in the waveguide panel 28 until a usable part of the display panel 12 is reached. A further benefit of the higher evanescent field strength is the increased immunity to the impacts of ambient lighting, and in particular, ambient lighting that has a high IR content. As will be described further below, other embodiments of the present invention provide even further ambient lighting immunity.

Figure 11:
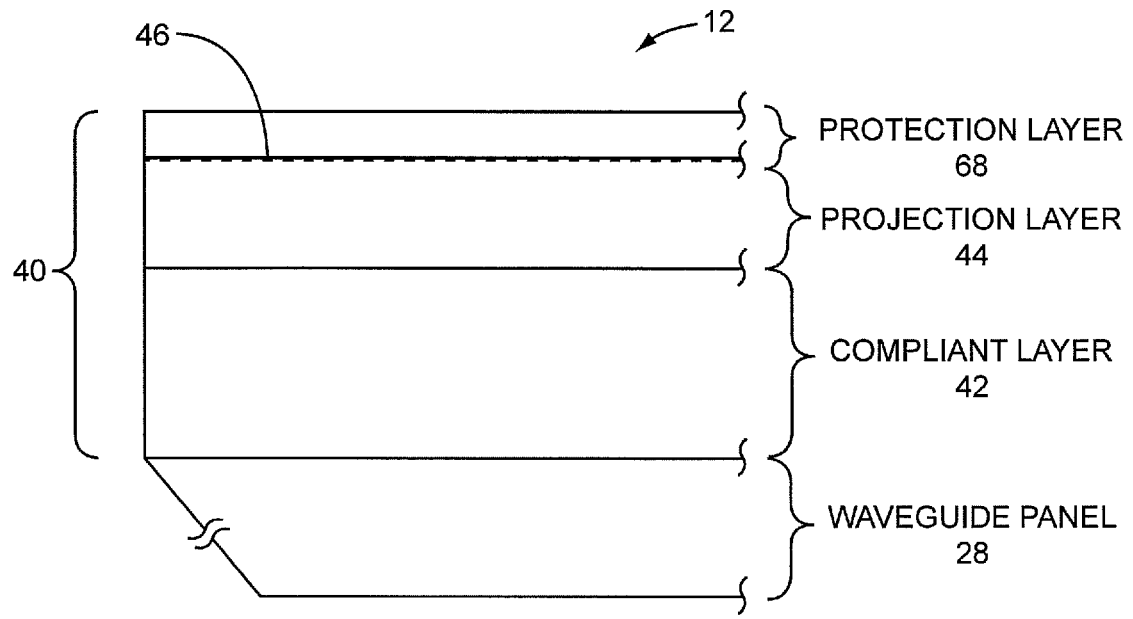
FIG. 11 illustrates a display panel composition according to a first embodiment of the present invention.
Figure 12:
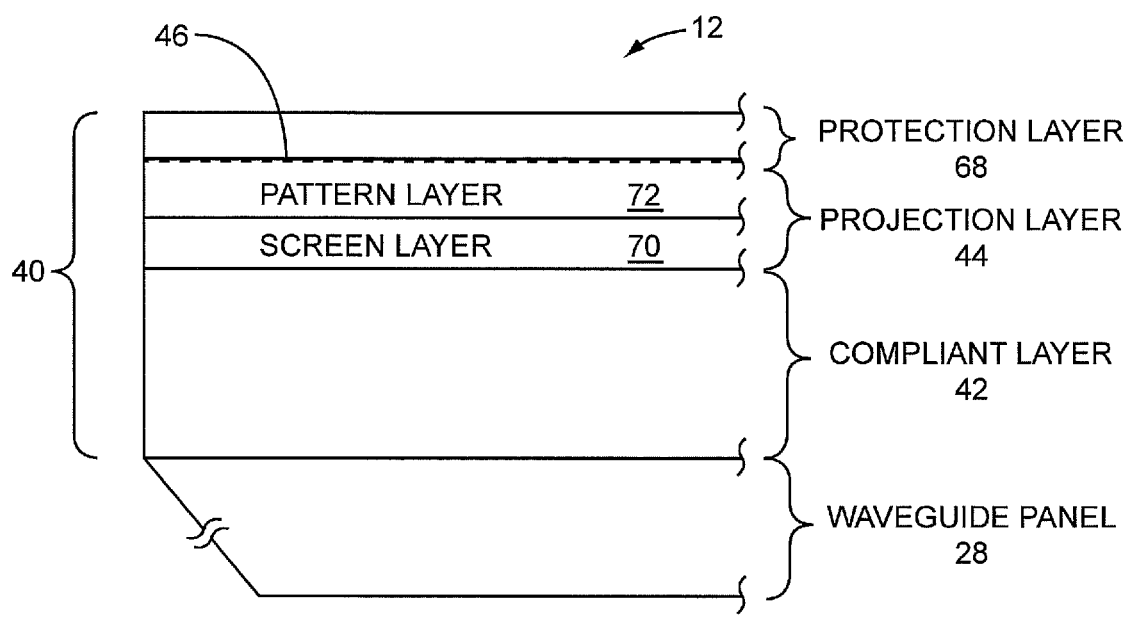
FIG. 12 illustrates a display panel composition according to a second embodiment of the present invention.
Figure 13:
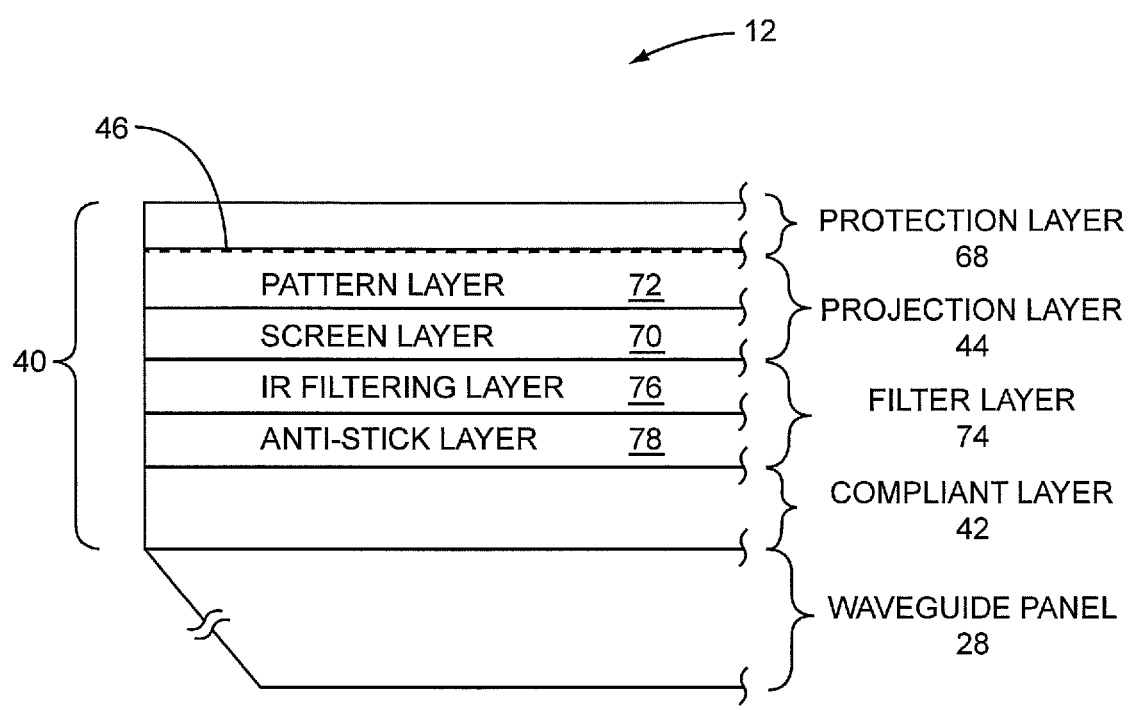
FIG. 13 illustrates a display panel composition according to a third embodiment of the present invention.

With reference to FIGS. 11-13, three different embodiments of the present invention are illustrated. In these embodiments, unique compositions are provided for the display panel 12. For each of these three embodiments, the various layers are identified and exemplary materials for each layer are described. With particular reference to FIG. 11, the display panel 12 includes a waveguide panel 28, a compliant layer 42 above the waveguide panel 28, a projection layer 44 above the compliant layer 42, and a protection layer 68 above the projection layer 44. Additional layers may be formed between or within these identified layers. Notably, the compliant layer 42, projection layer 44, and protection layer 68 are considered to be part of the surface layers 40. It is beneficial to configure the display panel 12 such that the location pattern 46 can be printed on the display panel 12 in a manner facilitating operation of the digital pens 38. The display panel 12 should be suitable for rear projection, and the location pattern 46 should be printed on the display panel 12 in a manner that does not significantly interfere with viewing the projected image. Finally, the display panel 12 should have an acceptable FTIR effect, and should preferably be able to work well in ambient lighting and provide a highly sensitive FTIR effect.

For the embodiment of FIG. 11, the location pattern 46, such as an Anoto pattern, is printed on the projection layer 44. Preferably, the projection layer 44 provides a translucent screen that the projected image is visible against, as well as a reflective background for the digital pen 38. In particular, the IR light emitted from the IR light source 56 should be reflected back toward the image sensor 58 of the digital pen 38 for areas that do not include dots or other pattern indicia associated with the location pattern 46. Further, the projection layer 44 should be configured such that it does not stick to the compliant layer 42. A white Rosco screen, or similar rear projection screen, meets the desired requirements for the projection layer 44. Other materials for the projection layer 44 may include HP Backlit UV or a backlit rigid PVC layer. The compliant layer 42 is preferably formed of silicone or other appropriate compliant material. Preferred silicones include SORTA-Clear™ 40 and Elastocil® RT 601. Other materials for the compliant layer 42 may include Supatex or other suitable thin layers of latex. The waveguide panel 28 is preferably acrylic or like polycarbonate plate, such as Lexan® 9030. Other materials for the waveguide panel 28 include Plexiglas. The protection layer 68 may be formed from a clear, and preferably very thin, plastic foil, and is merely provided to reduce damage, abrasion, and wear to the projection layer 44. The protection layer 68 may be formed of transparent anti-scratch foils such as those used for windows, bus stops, or display cabinets. Notably, any number of layers can be provided above the projection layer 44; however, the addition of layers will ultimately bend the projected image as well as potentially hinder the ability of the digital pen 38 to read the location pattern 46.

With reference to FIG. 12, the overall composition of the display panel 12 is similar to that illustrated in FIG. 11. The primary exception is that the projection layer 44 is formed from two separate layers, which include a screen layer 70 and a pattern layer 72. In this instance, the pattern layer 72 is a clear plastic layer that has the location pattern 46 printed on it. Notably, the pattern layer 72 will not reflect IR light as required for operation of the digital pen 38. However, the screen layer 70 will provide a reflective background for the IR light and allow the digital pen 38 to work as described above. The screen layer 70, in addition to providing a matte IR light reflective background for the pattern layer 72, will also provide a medium on which the projected image will be visible. Again, a white Rosco screen or the like meets all the requirements for the screen layer 70. The protection layer 68, compliant layer 42, and waveguide panel 28 may be configured as described above.

Turning now to FIG. 13, the third embodiment of the display panel 12 is illustrated. This embodiment provides the most immunity to ambient light that has a high IR content. The embodiment is shown as being the same as the embodiment of FIG. 12, with the exception that a filter layer 74 is provided between the projection layer 44 and the compliant layer 42. Further, the filter layer 74 is broken into two layers, which include an IR filtering layer 76 and an anti-stick layer 78. The IR filtering layer 76 is preferably a thin foil, which is capable of filtering ambient light, and in particular is capable of filtering the IR content of ambient light. Materials for the IR filtering layer 76 may include transparent sun protection foils and heat reflecting foils. As such, the IR filtering layer 76 will at least reduce the amount of IR content from ambient light that will reach the compliant layer 42 and the waveguide panel 28. The anti-stick layer 78 is provided to prevent the IR filtering layer 76 from sticking to the compliant layer 42 after a touch event. When a person presses on the protection layer 68, without the anti-stick layer 78, there is a tendency for the foil of the IR filtering layer 76 to stick to the silicone of the compliant layer 42. Such sticking may trigger a continuous and lingering FTIR effect after the touch event is removed. Preferably, the anti-stick layer 78 is transparent. Tracing paper has proven to be a suitable material for this layer. Other materials for the anti-stick layer 78 may include a thin layer of Teflon spray or clear coat.

Those skilled in the art will recognize improvements and modifications to the preferred embodiments of the present invention. All such improvements and modifications are considered within the scope of the concepts disclosed herein and the claims that follow.

What is claimed is:
1. A multi-touch display system comprising:
a display panel comprising a front surface to receive human touches and a location pattern provided in association with the front surface, the location pattern readable by a digital pen from the front surface and providing unique location indicia for the front surface wherein unique locations in the location pattern are identifiable from corresponding portions of the unique location indicia, and wherein a unique identifier of the display panel is encoded in the location pattern;

touch sensing circuitry adapted to detect the human touches on the front surface of the display panel and provide corresponding touch input;

a communication interface adapted to receive pen data bearing on writing information derived in response to the digital pen capturing images of those portions of the unique location indicia where the digital pen is being used to write; and processing circuitry associated with the touch sensing circuitry and the communication interface and adapted to control display content being displayed on the display panel in response to the touch input and the pen data.

2. The multi-touch display system of claim 1 wherein the location indicia of the location pattern is continuously variable across the entire front surface of the display panel such that the location indicia is unique at any point within the location pattern.

3. The multi-touch display system of claim 1 wherein the location indicia comprises a plurality of dots.

4. The multi-touch display system of claim 1 wherein the location pattern is an Anoto pattern.

5. The multi-touch display system of claim 1 wherein the location indicia at any point within the location pattern correspond to a unique location coordinate for the point in relation to the front surface of the display panel.

6. The multi-touch display system of claim 1 wherein the processing circuitry is adapted to control the display content by including writing substantially directly corresponding to what is being written on the display panel by the digital pen.

7. The multi-touch display system of claim 1 wherein the display panel comprises a rear surface further comprising a projector that is associated with the processing circuitry and configured to project the display content toward the rear surface of the display panel under control of the processing circuitry, the display panel configured to allow the display content being projected toward the rear surface to be viewable on the front surface.

8. The multi-touch display system of claim 1 wherein to detect the human touches on the front surface of the display panel, the touch sensing circuitry is adapted to detect reflected light that is reflected from a rear surface of the display panel in response to the human touches.

9. The multi-touch display system of claim 8 wherein reflected light is infrared light.

10. The multi-touch display system of claim 8 wherein the display panel comprises a waveguide panel and a light source adapted to inject light into the waveguide panel such that a state of total internal reflection is achieved within the waveguide panel when the front surface of the display panel is not being touched by a human and frustrated total internal reflections occur when the front surface of the display panel receives the human touches, certain of the frustrated total internal reflections being reflected light that is detectable by the touch sensing circuitry.

11. The multi-touch display system of claim 10 wherein the waveguide panel comprises a beveled perimeter edge that has a substantially flat edge surface on which the light source is mounted, the light source injecting the light into the waveguide panel through the substantially flat edge surface.

12. The multi-touch display system of claim 11 wherein the light source comprises a plurality of light emitting diodes that are mounted along the substantially flat edge surface of the beveled perimeter edge.

13. The multi-touch display system of claim 1 wherein the communication interface is a wireless communication interface that is adapted to receive the pen data via wireless communications.

14. The multi-touch display system of claim 13 wherein the wireless communication interface is adapted to communicate directly with the digital pen.

15. The multi-touch display system of claim 1 wherein the communication interface is adapted to communicate with a device or system that is capable of communicating with the digital pen.

16. The multi-touch display system of claim 1 wherein the display panel comprises a waveguide panel, a compliant layer adjacent to the waveguide panel, and a projection layer over the compliant layer, the projection layer comprising the location pattern and providing a projection surface on which an image of the display content is projected.

17. The multi-touch display system of claim 16 wherein the projection layer comprises a translucent screen layer and a pattern layer above the translucent screen layer wherein the translucent screen layer provides the projection surface and the pattern layer comprises the location pattern.

18. The multi-touch display system of claim 16 wherein the display panel further comprises a filter layer adapted to filter at least certain wavelengths of ambient light.

19. The multi-touch display system of claim 18 wherein the filter layer is provided between the compliant layer and the projection layer.

20. The multi-touch display system of claim 19 wherein the filter layer comprises:
a filtering layer to filter the at least certain wavelengths of ambient light; and
an anti-stick layer between the filtering layer and the compliant layer and configured to prevent the filtering layer from adhering to the compliant layer in response to the human touches.

21. The multi-touch display system of claim 16 wherein the waveguide panel comprises a beveled perimeter edge that has a substantially flat edge surface on which a light source is mounted, the light source injecting light into the waveguide panel through the substantially flat edge surface.

22. The multi-touch display system of claim 21 wherein an angle formed between the substantially flat edge surface and the front surface is between about 30 degrees and 60 degrees.

23. The multi-touch display system of claim 22 wherein the angle formed between the substantially flat edge surface and the front surface is around about 45 degrees.

24. The multi-touch display system of claim 16 wherein the projection layer further provides a reflection surface from which light that is provided from a light source of the digital pen and that is not absorbed by the location pattern is reflected back toward a light sensor of the digital pen.

25. The multi-touch display system of claim 1 wherein the touch sensing circuitry is adapted to detect frustrated total internal reflections.

26. The multi-touch display system of claim 1 further comprising the digital pen, which comprises a body, a stylus at one end of the body, a pressure sensor associated with the stylus, an image sensor, a light source, and a processor associated with the pressure sensor and the image sensor, wherein the processor is adapted to capture successive images of those portions of the unique location indicia where the digital pen is being used to write in response to the pressure sensor indicating that the stylus is in contact with the front surface of the display panel, the light source illuminating those portions of the unique location indicia to facilitate image capture.

27. A multi-touch display system comprising:
a display panel comprising a front surface to receive human touches and a location pattern provided in association with the front surface, the location pattern readable by a digital pen from the front surface and providing unique location indicia for the front surface wherein unique locations in the location pattern are identifiable from corresponding portions of the unique location indicia;

touch sensing circuitry adapted to detect the human touches on the front surface of the display panel and provide corresponding touch input;

a communication interface adapted to receive pen data bearing on writing information derived in response to the digital pen capturing images of those portions of the unique location indicia where the digital pen is being used to write; and processing circuitry associated with the touch sensing circuitry and the communication interface and adapted to control display content being displayed on the display panel in response to the touch input and the pen data, wherein to detect the human touches on the front surface of the display panel, the touch sensing circuitry is adapted to detect reflected light that is reflected from a rear surface of the display panel in response to the human touches:

wherein the display panel comprises a waveguide panel and a light source adapted to inject light into the waveguide panel such that a state of total internal reflection is achieved within the waveguide panel when the front surface of the display panel is not being touched by a human and frustrated total internal reflections occur when the front surface of the display panel receives the human touches, certain of the frustrated total internal reflections being reflected light that is detectable by the touch sensing circuitry;

wherein the waveguide panel comprises a beveled perimeter edge that has a substantially flat edge surface on which the light source is mounted, the light source injecting the light into the waveguide panel through the substantially flat edge surface; and wherein an angle formed between the substantially flat edge surface and the front surface is between about 30 degrees and 60 degrees.

28. The multi-touch display system of claim 27 wherein the angle formed between the substantially flat edge surface and the front surface is around about 45 degrees.

* * * * *